United States Patent
Tseng et al.

(10) Patent No.: US 6,654,240 B1
(45) Date of Patent: Nov. 25, 2003

(54) COMPUTER-READABLE STORAGE DEVICE RACK

(75) Inventors: Fan-Mao Tseng, Taoyuan Hsien (TW); Lin-Sung Peng, Taoyuan Hsien (TW)

(73) Assignee: Enlight Corporation, Taoyuan (TW)

( * ) Notice: Subject to any disclaimer, the term of this patent is extended or adjusted under 35 U.S.C. 154(b) by 0 days.

(21) Appl. No.: 10/188,102

(22) Filed: Jul. 3, 2002

(51) Int. Cl.⁷ .................................................. G06F 1/16
(52) U.S. Cl. ...................... 361/685; 361/727; 312/332.1
(58) Field of Search .................................. 361/685, 683, 361/727; 312/332.1, 333; 369/75.1, 77.1

(56) References Cited

U.S. PATENT DOCUMENTS 5,262,923 A * 11/1993 Batta et al. .................. 361/685
6,370,022 B1 * 4/2002 Hooper et al. ............... 361/685
6,377,447 B1 * 4/2002 Boe ............................. 361/685
6,469,889 B1 * 10/2002 Gan ............................. 361/685

* cited by examiner

Primary Examiner—Darren Schuberg
Assistant Examiner—Anthony Q. Edwards
(74) Attorney, Agent, or Firm—Troxell Law Office PLLC

(57) ABSTRACT

A computer-readable storage device rack is constructed to include a rack body adapted to support computer-readable storage devices at different elevations, the rack body having transverse sliding tracks at two opposite side panels thereof and a plurality of retaining spring strips respectively protruded from the side panels and adapted for locking computer-readable storage devices, and a plurality of elongated holding down plates respectively inserted into the transverse sliding tracks to force the retaining spring strips into engagement with respective locating holes of the loaded computer-readable storage devices.

2 Claims, 6 Drawing Sheets

COMPUTER-READABLE STORAGE DEVICE RACK

BACKGROUND OF THE INVENTION

1. Field of the Invention

The present invention relates a computer-readable storage device rack adapted for holding a number of computer-readable storage devices, for example, hard diskdrives/disk players at different elevations and, more particularly, to such a computer-readable storage device rack in which elongated holding down plates are inserted into respective transverse sliding tracks to force retaining spring stripes of the rack body into engagement with respective locating holes of the installed computer-readable storage devices and to lock the installed computer-readable storage devices.

2. Description of the Related Art

Various computer-readable storage device racks have been disclosed for use in computers to hold modularized computer readable disk drivers/players (hard disk driver, floppy disk driver, CD-ROM player, DVD player, etc.). Conventional computer-readable storage device racks commonly use tie screws to fix loaded computer readable disk drivers/players in position. According to this installation method, it is convenient to remove one computer readable disk driver/player from the rack for repair. There are also known computer-readable storage device racks having locking means at one single side for locking loaded computer readable disk drivers/players. These designs are still not satisfactory in function. During delivery of the computers, the computer readable disk drivers/players tend to be forced out of position.

Patent Application Ser. No. 90216836 discloses a CD-ROM rack, which eliminates the aforesaid drawbacks. According to this design, the CD-ROM rack comprises a rack body adapted to support computer readable disk drivers/players on the inside at different elevations, the rack body having transverse sliding tracks at two opposite side panels thereof, a plurality of retaining spring plates respectively riveted to the side panels of the rack body and adapted for locking loaded computer readable disk drivers/players, and a plurality of elongated holding down plates respectively inserted into the transverse sliding tracks to hold down the retaining spring plates in the locking position. This design of CD-ROM rack is functional. However, the installation of the retaining spring plates in the side panels of the rack body is complicated, resulting in high manufacturing cost.

SUMMARY OF THE INVENTION

The present invention has been accomplished to provide a computer-readable storage device rack, which eliminates the aforesaid drawbacks. It is the main object of the present invention to provide a computer-readable storage device rack, which positively secures the installed computer-readable storage devices in position. It is another object of the present invention to provide a computer-readable storage device rack, which enables the installed computer-readable storage devices to be easily unlocked and removed from the rack body for repair. It is still another object of the present invention to provide a computer-readable storage device rack, which is inexpensive to manufacture. To achieve these and other objects of the present invention, the computer-readable storage device rack comprises a rack body adapted to support computer-readable storage devices at different elevations, the rack body having transverse sliding tracks at two opposite side panels thereof and a plurality of retaining spring strips respectively protruded from the side panels and adapted for locking computer-readable storage devices, and a plurality of elongated holding down plates respectively inserted into the transverse sliding tracks to force the retaining spring strips into engagement with respective locating holes of the loaded computer-readable storage devices.

DETAILED DESCRIPTION OF THE PREFERRED EMBODIMENT

Figure 1:
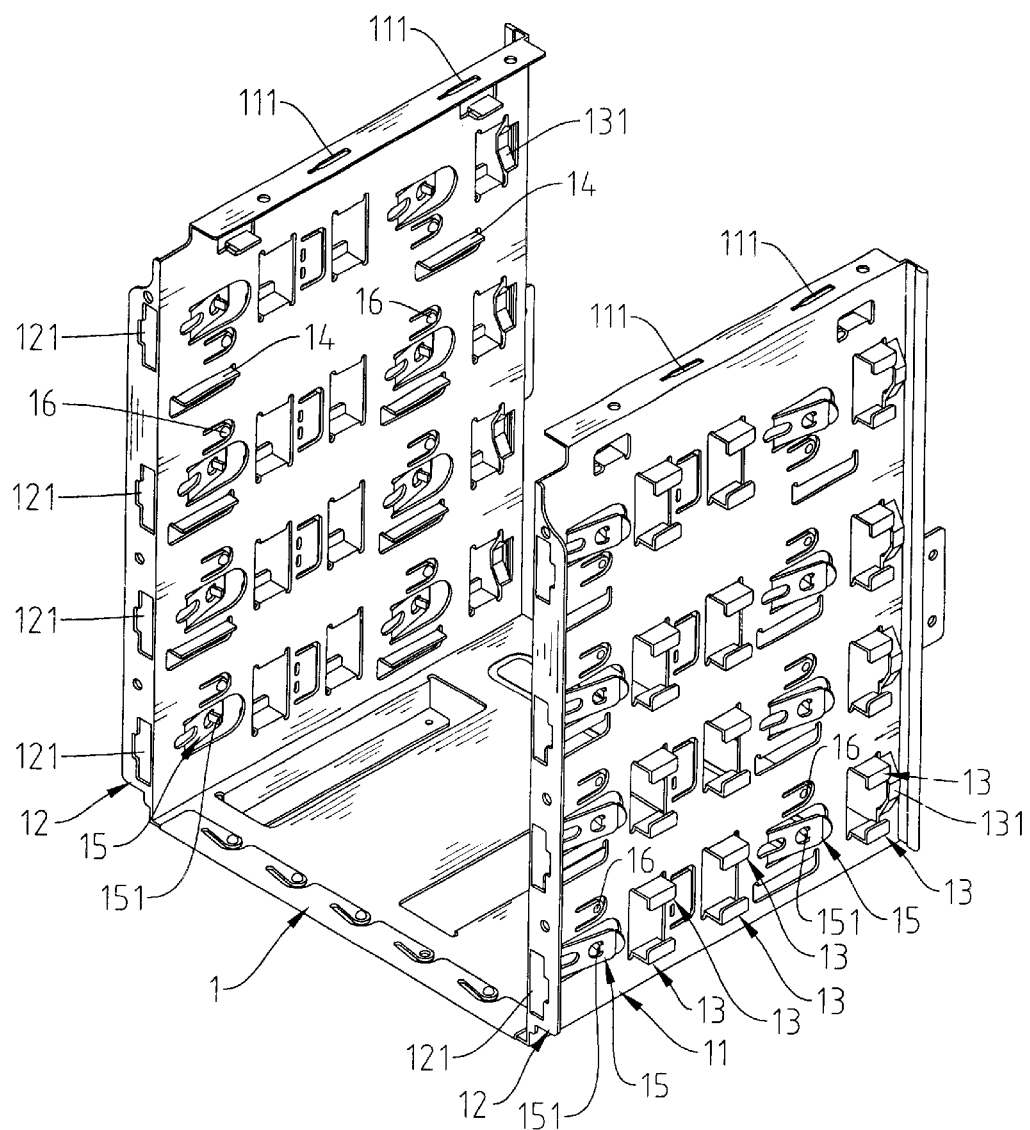
FIG. 1 is a perspective view of a rack body for a computer-readable storage device rack according to the present invention.
Figure 2:
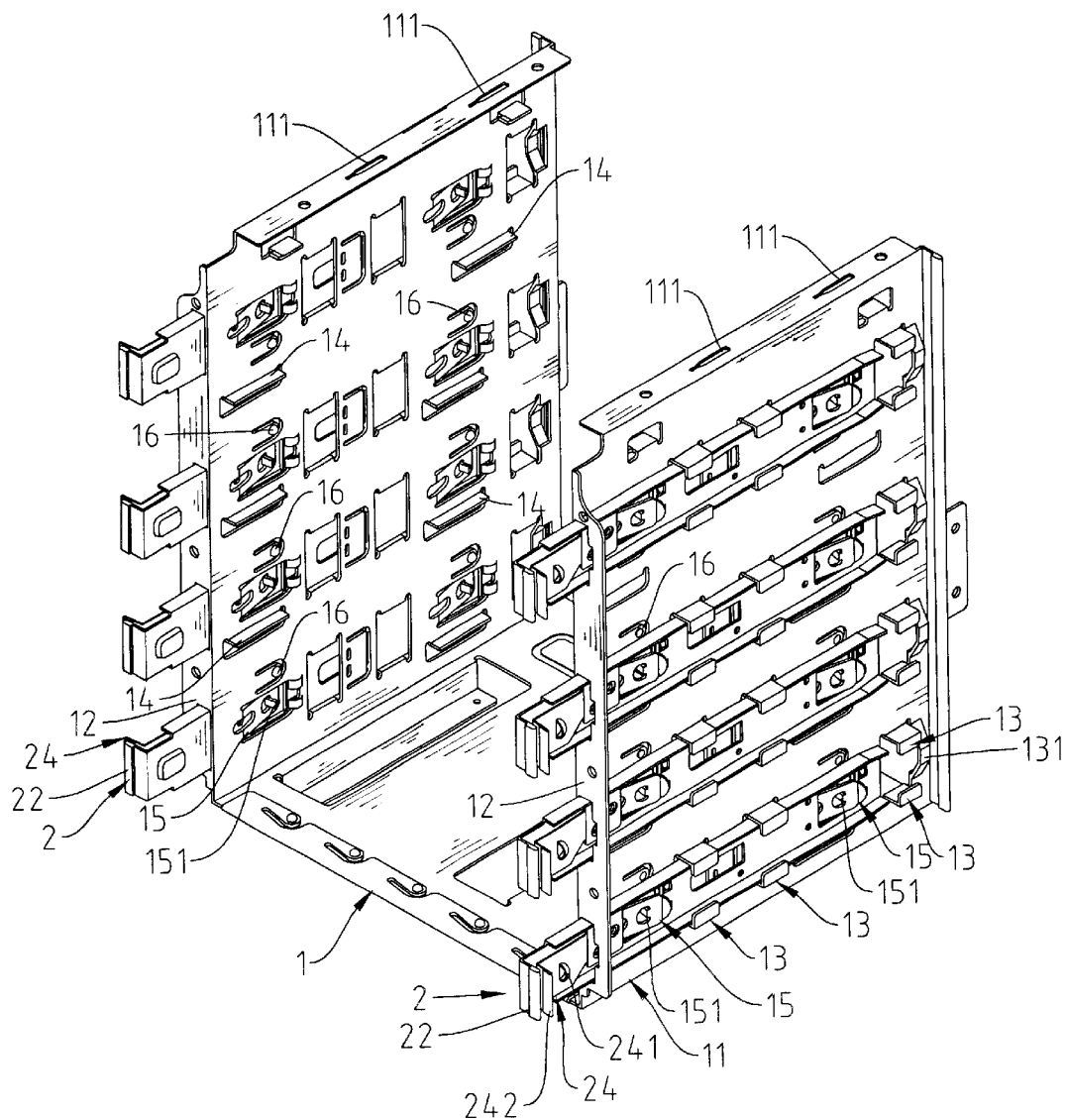
FIG. 2 is a perspective view of the present invention, showing the elongated holding down plates inserted into the sliding tracks of the rack body.
Figure 3:
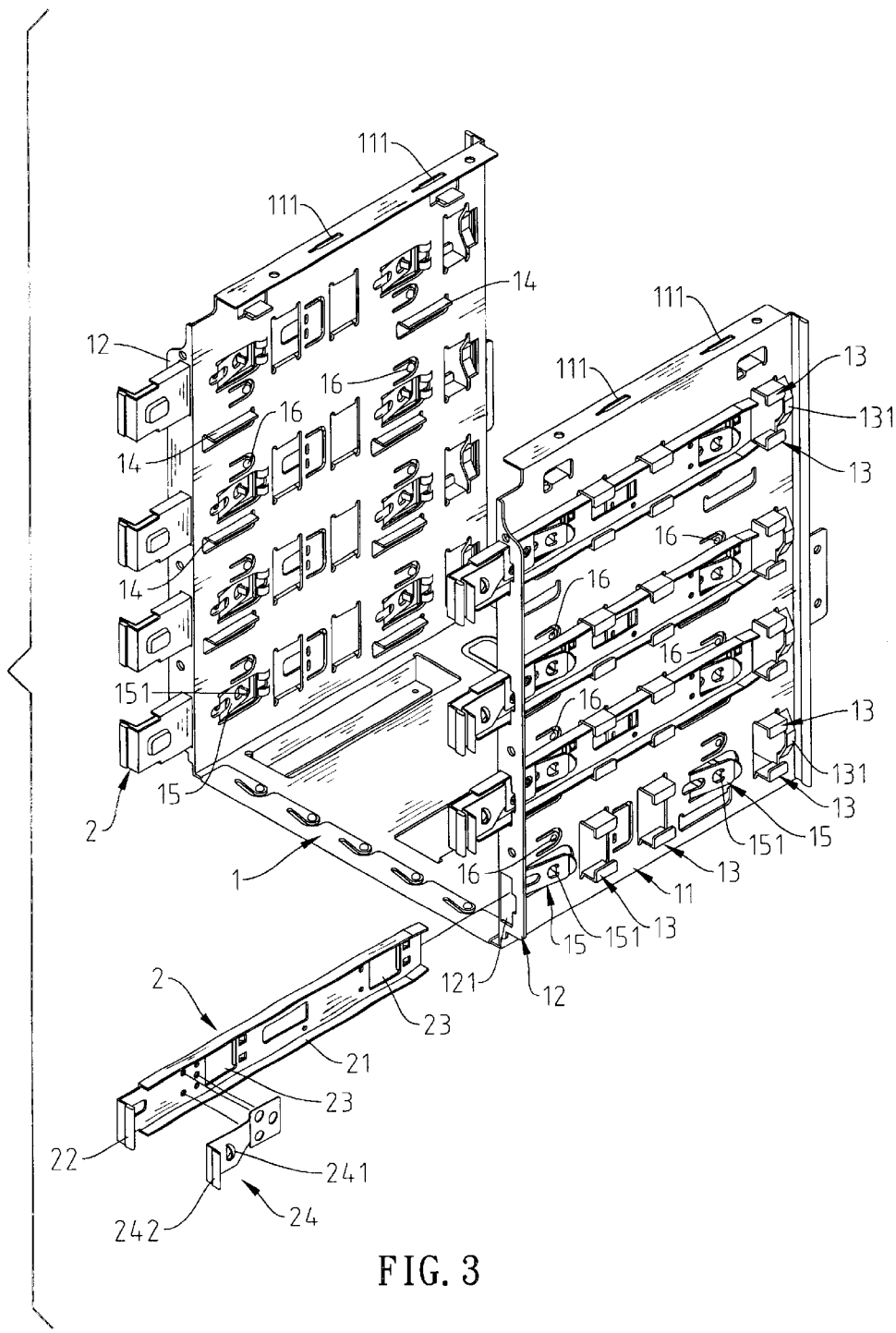
FIG. 3 is an exploded view of the computer-readable storage device rack according to the present invention.

Referring to FIGS. from 1 through 5, a computer-readable storage device rack in accordance with the present invention is generally comprised of a rack body 1, and a plurality of elongated holding down plates 2. The rack body 1 is adapted for holding a plurality of computer readable disk drivers/players 4 at different elevations, comprising two vertical side panels 11 arranged in parallel. The side panels 11 each comprise transverse rows of bearing lugs 14 horizontally disposed on the inside and adapted for supporting computer-readable storage devices 4 at different elevations, a plurality of hanging holes 111 disposed at the top side for hanging in the computer case (not shown), a plurality of transverse sliding tracks 13 disposed on the outside at different elevations corresponding to the transverse rows of bearing lugs 14, a plurality of protruded stop portions 131 respectively disposed on the outside at the rear ends of the transverse sliding tracks 13, a front flange 12 outwardly extended from the front side thereof at right angles, a plurality of front insertion holes 121 disposed in the front flange 12 at different elevations corresponding to the transverse sliding tracks 13, a plurality of protruded springy retaining portions 16 respectively disposed on the inside at different elevations, and rows of retaining spring strips 15 respectively formed of a part of the respective side panel 11 by stamping and disposed in the transverse sliding tracks 13. The retaining spring strips 15 each have a locating pin 151 protruded from the respective free end.

The elongated holding down plates 2 are respectively inserted through the front insertion holes 121 into the transverse sliding tracks 13 of the side panels 11 of the rack body 1, each comprising two longitudinal rails 21 respectively extended along the top and bottom sides thereof and adapted for guiding the respective elongated holding down plate 2 into the corresponding transverse sliding track 13, a front hook 22 extended from the front end thereof, a plurality of openings 23 corresponding to the retaining spring strips 15, and a locking spring plate 24 riveted to a front part thereof between the front hook 22 and the first one of the openings 23. The locking spring plate 24 comprises a protruded retaining portion 241 and a finger spring 242.

Referring to FIGS. 3~6, each computer-readable storage device 3 has a plurality of locating holes 31 symmetrically disposed in the two opposite lateral sidewalls thereof. When one computer-readable storage device 3 inserted into the rack body 1 and supported on one transverse row of bearing lugs 14 of each side panel 11 of the rack body 1, the two opposite lateral sidewalls of the computer-readable storage device 3 are stopped against corresponding protruded springy retaining portions 16 of the side panels 11 of the rack body 1 and retained in position.

Figure 4:
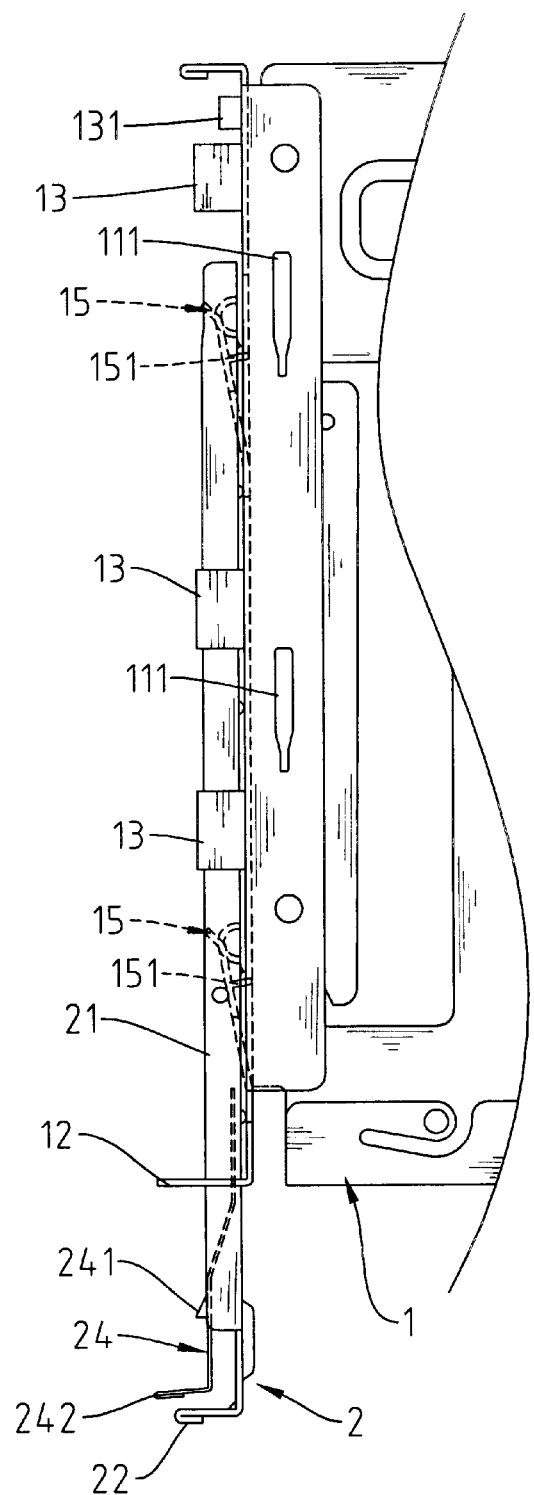
FIG. 4 is a top plain view of a part of the computer-readable storage device rack according to the present invention.
Figure 5:
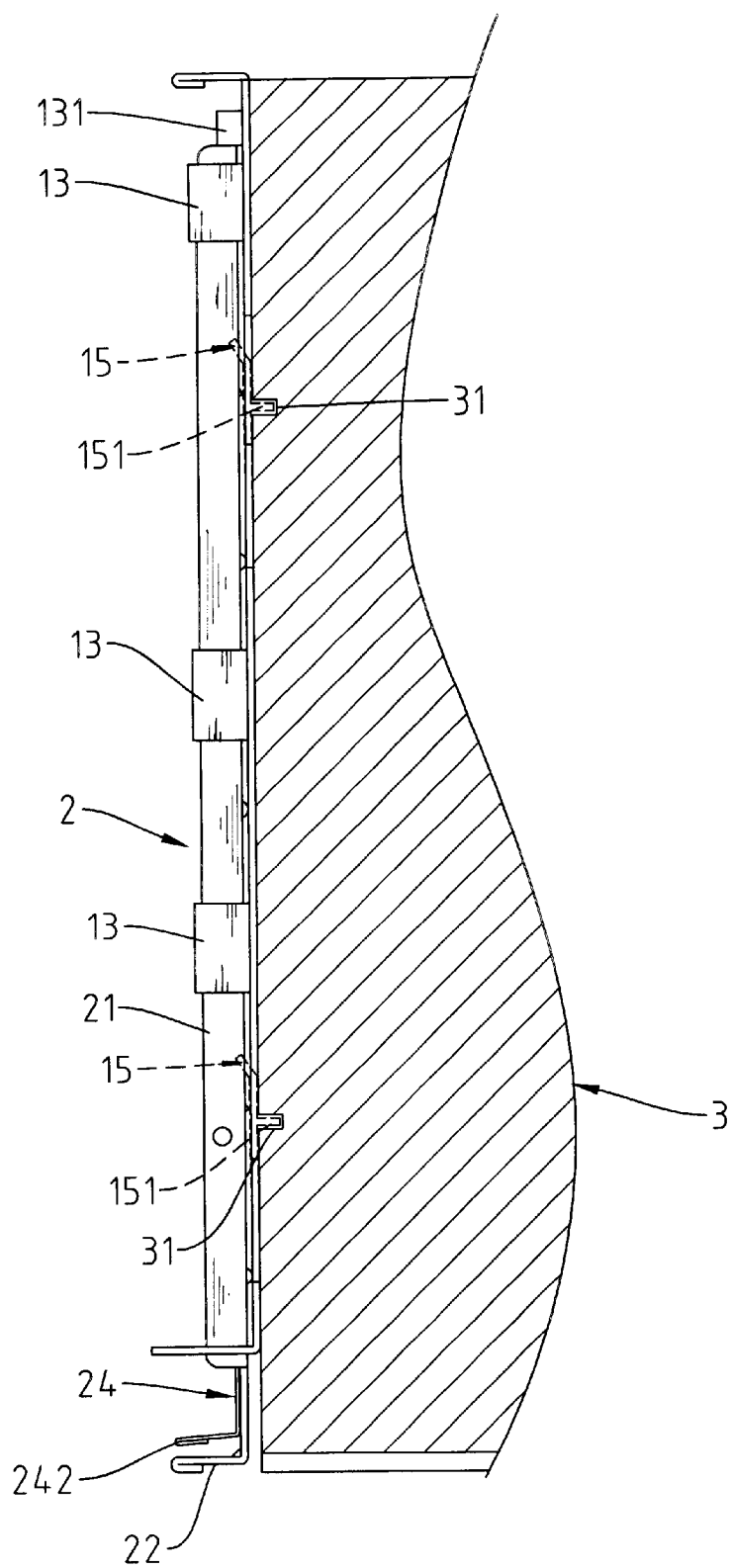
FIG. 5 is a schematic drawing showing computer-readable storage devices installed in the computer-readable storage device rack according to the present invention.
Figure 6:
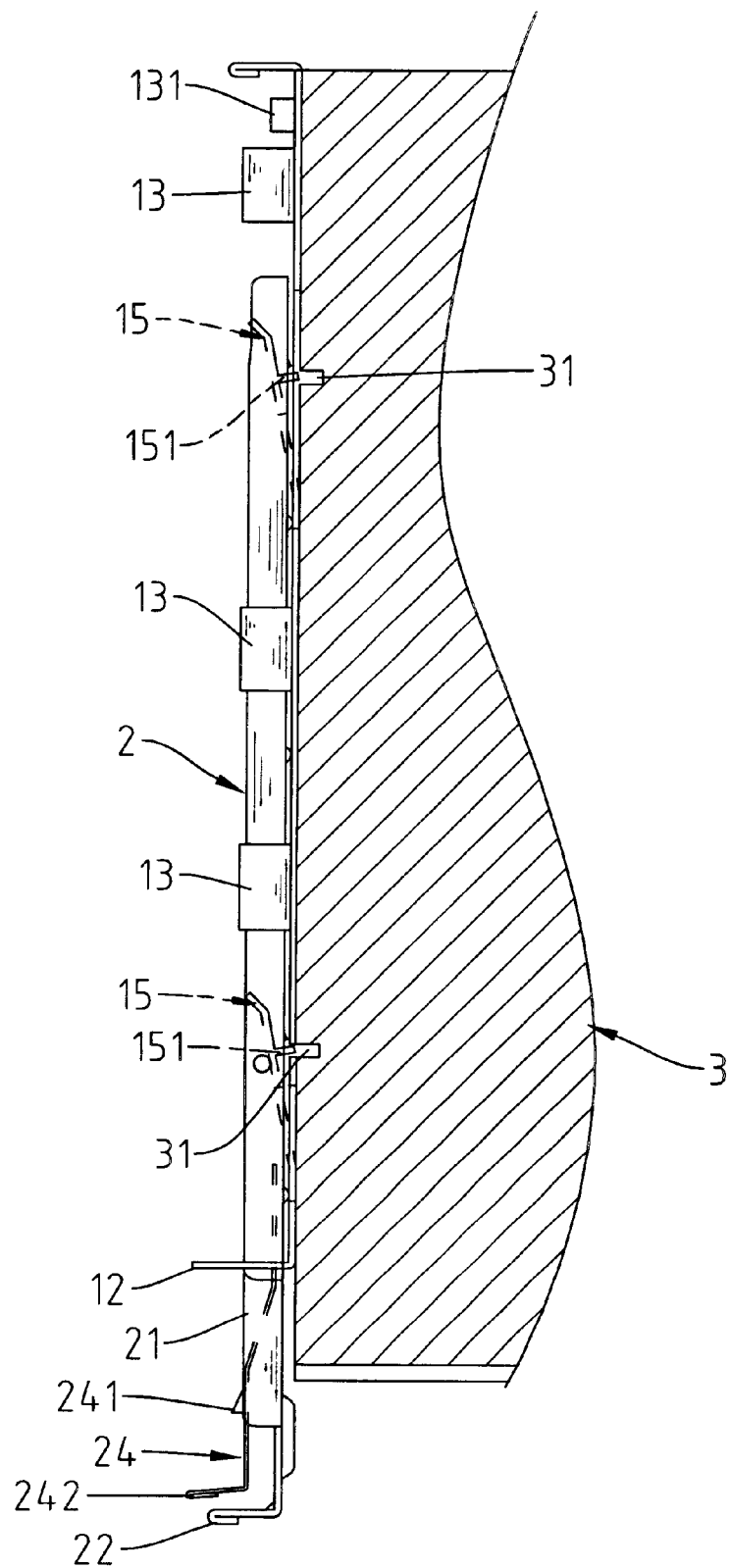
FIG. 6 is similar to FIG. 6 but showing the elongated holding down plate pulled outwards, the locating pins of the retaining spring plates disengaged from the locating holes of the loaded computer-readable storage device.

Referring to FIGS. 4~6, after insertion of one computer-readable storage device 3 in the rack body 1, two elongated holding down plates 2 are respectively inserted through the corresponding front insertion holes 121 of the front flanges 12 of the side panels 11 of the rack body 1 into the corresponding transverse sliding tracks 13 of the side panels 11 and stopped at the corresponding protruded stop portions 131 of the side panels 11 of the rack body 1 to lock the computer-readable storage device 3. After insertion of one elongated holding down plate 2 into the transverse sliding track 13 of one side panel 11 of the rack body 1, the locating pins 151 of the corresponding retaining spring strips 15 are forced through the openings 23 of the inserted elongated holding down plate 2 and engaged into the respective locating holes 31 of the corresponding computer-readable storage device 3, and therefore the corresponding computer-readable storage device 3 is locked.

After installation of the elongated holding down plates 2 in the rack body 1, the locking spring plates 24 of the elongated holding down plates 2 are turned by hand to engage the respective protruded retaining portions 241 into the front insertion holes 121, keeping the elongated holding down plates 2 positively secured to the side panels 11 of the rack body 1.

When removing the installed computer-readable storage devices 3 from the rack body 1, move the finger strips 242 of the locking spring plates 24 of the elongated holding down plates 2 to disengage the protruded retaining portions 241 of the locking spring plates 24 from the front insertion holes 121 of the front flanges 12 of the side panels 11 of the rack body 1, and then pull the elongated holding down plates 3 outwards from the front insertion holes 121 of the front flanges 12 of the side panels 11 of the rack body 1 to release the retaining spring strips 15 from the computer-readable storage devices 3, for enabling the computer-readable storage devices 3 to be pulled out of the rack body 1.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A computer-readable storage device rack comprising:

a rack body, said rack body comprising two vertical side panels arranged in parallel, said side panels each comprising a plurality of transverse rows of bearing lugs horizontally disposed on an inside wall thereof and adapted for supporting computer-readable storage devices inside said rack body at different elevations, a plurality of transverse sliding tracks disposed on an outside wall thereof at different elevations corresponding to said transverse rows of bearing lugs, a front flange outwardly extended from a front side thereof at right angles, and a plurality of front insertion holes disposed in said front flange at different elevations corresponding to said transverse sliding tracks; and a plurality of elongated holding down plates adapted for inserting into the transverse sliding tracks of the side panels of said rack body to lock the computer-readable storage devices been inserted in said rack body, said elongated holding down plates each comprising two longitudinal rails respectively extended along top and bottom sides thereof and adapted for guiding the respective elongated holding down plates into the transverse sliding tracks of the side panels of said rack body, a front hook extended from a front end thereof and adapted for mounting, a plurality of openings spaced between two distal ends thereof, and a locking spring plate riveted to a front part thereof, said locking spring plate comprising a protruded retaining portion adapted for engaging one front insertion hole in the front flange of one side panel of said rack body, and a finger spring for operation by hand to move said protruded retaining portion in and out of one front insertion hole in the front flange of one side panel of said rack body;

wherein said side panels of said rack body each comprise rows of retaining spring strips disposed in said transverse sliding tracks, said retaining spring strips each having a locating pin protruded from one end thereof and adapted for engaging in one locating hole in the corresponding computer-readable storage device been inserted into said rack body upon insertion of one elongated holding down plate into the corresponding sliding track in said rack body.

2. The computer-readable storage device rack as claimed in claim 1, wherein said side panels each have a plurality of hanging holes respectively disposed at a top side for hanging in a computer case.

* * * * *